Aug. 5, 1958 L. A. HEINTZELMAN 2,846,527

TELEPHONE MOUTHPIECE VOICE SILENCER

Filed Dec. 13, 1954

INVENTOR.
LEO A. HEINTZELMAN
BY
Frank E. Liverance Jr.
ATTORNEY 2,846,527

TELEPHONE MOUTHPIECE VOICE SILENCER

Leo A. Heintzelman, Grand Rapids, Mich., assignor to Johnson-Hartmann, Chicago, Ill., a partnership Application December 13, 1954, Serial No. 474,727

5 Claims. (Cl. 179—188)

The present invention is directed to a novel, especially simple and inexpensive, but very effective voice silencer which in use is connected with the mouthpiece in a telephone set. Such voice silencers applied to telephone mouthpieces are known but in general have a complicated structure, in some cases interfere with placing the telephone instrument back upon its supporting base in "hand set" telephones, are not easy to attach and remove and are substantially fixed with relation to the mouthpiece of a telephone set with which used when connected therewith. With my invention not only is an exceptionally practical and simple silencer provided which can be readily attached to a telephone mouthpiece, but with such attachment a desired degree of movability or adjustability of the silencer to the mouthpiece is automatically obtained as in placing the telephone instrument back upon its supporting base, also in the automatic adjustment of such silencer to the mouth of the one speaking into the mouthpiece of the telephone set.

An understanding of the invention and a preferred structure embodying the same may be had from the following description, taken in connection with the accompanying drawing, in which, Fig. 1 is a perspective view of the hand carried telephone instrument common to the hand set type of telephones, showing the voice silencer of my invention attached to the mouthpiece thereof.

Like reference characters refer to like parts in the different figures of the drawing.

Figure 1:
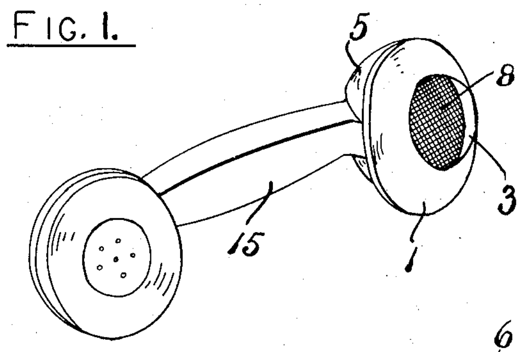
Figures 2, 3, 4, 5:
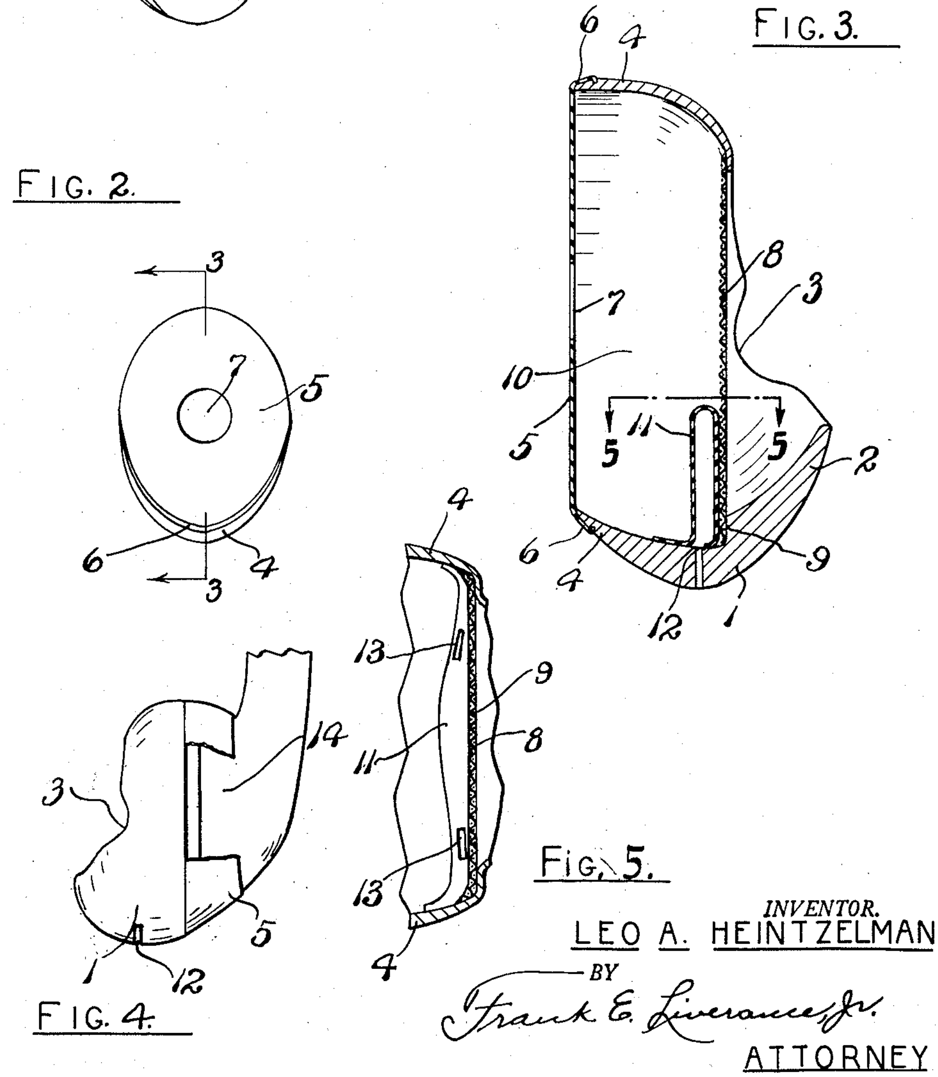
Fig. 2 is an elevation of the silencer looking at the side thereof which is attached to the telephone mouthpiece.
Fig. 3 is an enlarged vertical section substantially on on the plane of line 3—3 of Fig. 2.
Fig. 4 is an end elevation of a telephone mouthpiece with the silencer attachment of my invention applied thereto, a portion of the attaching means being broken away.
Fig. 5 is a horizontal section substantially on the plane of line 5—5 of Fig. 3, looking downwardly.

In the construction which I have made in practically embodying my invention, a body 1 is provided which in effect is an annular shell, there being a large opening through such body or shell from one side to the other. The shell at its lower portion is of greater thickness than its upper and side portions, and at the mouth side has an upwardly and outwardly extending lip 2, the central portion of which is at a lower position than the side portions thereof, the side portions extending upwardly and inwardly to provide a progressively decreasing distance between opposite sides of the shell or body as shown in Fig. 3, such progressively decreasing dimensions being indicated by the line 3 which is inwardly recessed as shown at each side of the central portion of the lip 2. The recesses provide room for the nose of the one talking and the mouth may be brought closely to the body opening. Such lip and the lower portion of the shell body of greater thickness than the remaining portions has the property of sound wave absorption, primarily because of the sound absorbing character of the material used. Many materials may be used having this property, one of which is a light weight wood but other equivalent materials having the same properties of sound wave absorption in greater or less degrees may be used. The upper and side portions of the body as indicated at 4 are thinner, as shown in Fig. 3, than the lower portions.

What may be designated as the inner side of such shell body is substantially closed by a thin, very resilient and flexible side 5, in practice made of a tough rubber which may be greatly stretched without danger of rupture or damage. The edge portions 6 of the member 5 are permanently secured to the body by any suitable means of attachment such as cementing or the like. At the generally central portion of the member 5 an opening 7 is made which, while preferably of circular outline, may be varied without appreciably affecting the invention to other forms such as oval or the like.

A vertical screen 8 parallels the resilient member 5 and is spaced therefrom being located closely adjacent the open side of the body 1 and secured at its edge portions across such opening at the edge portions of the shell 4 around the upper end and sides of said opening and against an annular shoulder 9 formed at the lower portion of and within the body 1. There is thus provided a chamber 10 within the body between such screen 8 and the member 5.

The screen 8 is not essential in connection with the structure described but is desirable, forming a support for one vertical side of a lung 11 vertically positioned as shown in Fig. 3 made of thin rubber material having two spaced generally vertical sides integrally connected at their upper and side edges and reaching to the bottom of the chamber 10. The unsupported side of the lung being of a flexible resilient material such as rubber, forms a sound deadening diaphragm for damping and thereby absorbing sound wave vibrations within the chamber 10. Such lung encloses a chamber which is connected to the outside at its lower end by a vertical slot 12 through the thickened bottom of the body 1 and at its upper end by slots 13 made through the lung as shown in Fig. 5.

In a hand set telephone, the mouthpiece 14 thereof is at one end and the earpiece at the other end of an interposed connecting bar 15 between them as well known. The thin resilient member 5 is stretched so that at its opening 7 it passes over the mouthpiece 14 and contracts after passing over the larger outer portion thereof, gripping the outer surface of the mouthpiece. The mouthpiece is between the resilient rubber member 5 and the screen 8 being housed within the chamber 10 shown in Fig. 3. Such chamber is of larger size than the cross sectional area of the largest portion of the mouthpiece 14. This permits a ready change of position of the silencer with respect to the mouthpiece. It may be tilted within the limits permitted by such size differences to different angles and there may be a bodily movement of the silencer with respect to the mouthpiece such that the mouthpiece of the telephone set may be moved upwardly and come close to the upper wall 4 of the body shell.

Such movement provides an automatic tilting of the silencer so that the mouth of one talking into it will be in proper position and the open outer side of the body substantially closed by the face of the one talking. The relative upward movement of the telephone mouthpiece in the chamber 10 will occur substantially automatically when the telephone set, consisting of the bar, the earpiece and mouthpiece, is placed on the usual telephone stand, the silencer of my invention taking an inclined position in which the lower, heavier thicker portion is outside of the adjacent vertical side of the supporting stand and the upper, narrower portion is readily received in the space available for it between the telephone mouthpiece and the upper side of the stand. The rubber member 5 yields or stretches to the extent required in such relative movements of the silencer with respect to the telephone mouthpiece.

The lung at 11 has sound silencing properties in eliminating or absorbing sound wave vibrations through the passages provided between the sides thereof, open at the upper end of the lung in the slots 13, and at the lower end in the slot 12 in the body 1.

The structure described is useful, the voice of one talking into the telephone being silenced or muted to a very large degree. The silencer is readily manufactured, is simple and inexpensive to produce and serves the purposes for which made in an exceptionally satisfactory manner.

The invention is defined in the appended claims and is to be considered comprehensive of all forms of structure coming within their scope.

I claim:

1. A voice silencer of the class described, comprising an annular body open at opposite sides, having an inner chamber of a size to freely and loosely receive a telephone mouthpiece, and a lip integral with said body extending upwardly and outwardly from the lower side of the opening at one side of said body, said body decreasing in dimensions transversely from the central portion of the free edge of said lip to the upper end of the body, and elastic, resilient means secured to the body at the opposite side thereof to yieldingly grip a telephone mouthpiece housed in said chamber at and over its outer surfaces, and a screen secured within said body located across the body and spaced from said resilent means, and a thin impervious lung secured to and against the lower portion of said screen back of the lip and spaced therefrom, said lung having spaced vertical sides integrally connected at upper ends and sides and secured at lower ends to said body, the body having a vertical slot therethrough to the interior of said lung, and said lung at its upper end having an opening therethrough.

2. A telephone mouthpiece comprising, an annular body having an enlarged chamber therein adapted to receive and house a telephone mouthpiece, said chamber having a larger interior annular periphery than the annular periphery of a mouthpiece housed therein, a member of thin, flexible, highly elastic rubber secured to said body across and closing said chamber at one side, said member having a generally central opening therethrough of an area less than the cross sectional area of a telephone mouthpiece received in said recess, and a transversely disposed hollow lung at the inner side and lower portion of said chamber extending from one side to the other of said annular body, said body having a vertical slot through its lower portion communicating with the interior of said lung, and said lung, at its upper side having openings communicating with said chamber.

3. A telephone mouthpiece comprising, an annular body having an enlarged chamber therein adapted to receive and house a telephone mouthpiece, said chamber having a larger interior annular periphery of a mouthpiece housed therein, a member of thin, flexible, highly elastic rubber secured to said body across and closing said chamber at one side, said member having a generally central opening therethrough of an area less than the cross sectional area of a telephone mouthpiece received in said recess, and a transversely disposed hollow lung at the inner side and lower portion of said chamber extending from one side to the other of said annular body, said lung having walls of thin flexible, resilent material, said body having a vertical slot through its lower portion communicating with the interior of said lung, and said lung, at its upper side having openings communicating with said chamber.

4. A telephone mouthpiece voice silencer comprising, in combination, an annular body having an enlarged chamber therein adapted to receive and house a telephone mouthpiece, means on said body for gripping the telephone mouthpiece, and a hollow lung extending transversely from one side to the other of said body and closing a segmental portion of said chamber, said lung including a thin impervious flexible diaphragm member, said body having a slot therethrough from its outer surface to the interior of said lung, and said lung having an opening therein communicating with said chamber.

5. A telephone mouthpiece voice silencer comprising, in combination, an annular body open at opposite sides and having an inner chamber of a size to receive a telephone mouthpiece, a lip integral with said body extending upwardly and outwardly from the lower portion of the opening at one side of the body, said body increasing in dimensions transversely from the central portion of the free edge of said lip to the upper portion of the body, resilient means on said body at the opposite side thereof from the lip to grip a telephone mouthpiece housed in said chamber, and a transversely disposed hollow lung in said chamber closing a segmental portion thereof, said lung including a thin impervious flexible diaphragm member secured at its peripheral edges to said body, said body having a slot therethrough to the interior of said lung, and said lung having openings therein communicating with said chamber.

References Cited in the file of this patent

UNITED STATES PATENTS

| | | |
|---|---|---|
| 2,245,724 | Scher | June 17, 1941 |
| 2,478,783 | Scher | Aug. 9, 1949 |
| 2,670,054 | Tuttle | Feb. 23, 1954 |
| 2,754,377 | Junghans | July 10, 1956 |

FOREIGN PATENTS

| | | |
|---|---|---|
| 506,339 | Great Britain | May 22, 1939 |